United States Patent
Lagakos et al.

(10) Patent No.: US 8,322,919 B2
(45) Date of Patent: Dec. 4, 2012

(54) MINIATURE FIBER OPTIC TEMPERATURE SENSOR WITH EDGE REFLECTOR

(75) Inventors: Nicholas Lagakos, Silver Spring, MD (US); Joseph A Bucaro, Herndon, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 439 days.

(21) Appl. No.: 12/698,646

(22) Filed: Feb. 2, 2010

(65) Prior Publication Data

US 2011/0044373 A1 Feb. 24, 2011

Related U.S. Application Data

(60) Provisional application No. 61/235,157, filed on Aug. 19, 2009.

(51) Int. Cl.
*G01K 11/32* (2006.01)
*G01K 11/12* (2006.01)

(52) U.S. Cl. ............... 374/130; 374/160; 374/43

(58) Field of Classification Search ......... 374/43–45, 374/46, 55, 57, 159–160, 120–121, 130–131, 374/17–18, 141; 356/43
See application file for complete search history.

(56) References Cited

U.S. PATENT DOCUMENTS

| | | | |
|---|---|---|---|
| 4,162,397 A | 7/1979 | Bucaro et al. | |
| 4,238,856 A | 12/1980 | Bucaro et al. | |
| 4,363,114 A | 12/1982 | Bucaro et al. | |
| 4,427,263 A | 1/1984 | Lagakos et al. | |
| 4,482,205 A | 11/1984 | Lagakos et al. | |
| 4,621,896 A | 11/1986 | Lagakos et al. | |
| 4,743,752 A * | 5/1988 | Olsen et al. | 250/206.1 |
| 4,749,856 A | 6/1988 | Walker et al. | |
| 4,799,751 A | 1/1989 | Tekippe | |
| 4,800,267 A | 1/1989 | Freal et al. | |
| 4,805,630 A | 2/1989 | Storey | |
| 4,930,862 A | 6/1990 | Miers et al. | |
| 4,979,798 A | 12/1990 | Lagakos et al. | |
| 4,994,668 A | 2/1991 | Lagakos et al. | |
| 5,133,210 A * | 7/1992 | Lesko et al. | 73/81 |
| 5,146,083 A | 9/1992 | Zuckerwar et al. | |
| 5,258,614 A | 11/1993 | Kidwell et al. | |
| 5,279,793 A | 1/1994 | Glass | |
| 5,301,001 A | 4/1994 | Murphy et al. | |
| 5,345,519 A | 9/1994 | Lu | |

(Continued)

OTHER PUBLICATIONS

Bucaro J.A.,Lagakos, N., "Fiber Optics Pressure and Acceleration Sensors", Proceeding of the 47th International Instrument symposium,Denver, CO (May 6-10, 2001).

(Continued)

*Primary Examiner* — Gail Verbitsky
(74) *Attorney, Agent, or Firm* — Amy Ressing; Sally Ferrett (57) ABSTRACT

A fiber-optic temperature sensor with a cantilever beam including two different material strips with different thermal expansion coefficients, the cantilever beam having a reflective surface on an end of the cantilever beam, an optical fiber probe including a transmitting multimode optical fiber and at least one receiving multimode optical fiber for receiving reflected light from the reflective surface. Temperature changes at the sensor are indicated by a change in reflected light coupled into the receiving multimode optical fiber due to lateral displacement of the edge of the reflective surface caused by bending of the cantilever beam. Some embodiments have additional reference receiving fibers for compensation for noise, changes in gap length, and other factors.

17 Claims, 9 Drawing Sheets

U.S. PATENT DOCUMENTS

| | | | |
|---|---|---|---|
| 5,367,376 | A | 11/1994 | Lagakos et al. |
| 5,563,967 | A * | 10/1996 | Haake ........................ 385/12 |
| 5,594,819 | A | 1/1997 | Narendran et al. |
| 5,633,960 | A | 5/1997 | Lagakos et al. |
| 5,726,744 | A | 3/1998 | Ferdinand et al. |
| 5,805,753 | A | 9/1998 | Lagakos et al. |
| 5,825,489 | A | 10/1998 | Lagakos et al. |
| 6,118,534 | A | 9/2000 | Miller |
| 6,278,810 | B1 * | 8/2001 | Sirkis et al. .................... 385/12 |
| 6,281,976 | B1 | 8/2001 | Taylor et al. |
| 6,439,055 | B1 | 8/2002 | Maron et al. |
| 6,539,136 | B1 | 3/2003 | Dianov et al. |
| 6,563,105 | B2 * | 5/2003 | Seibel et al. ................ 250/208.1 |
| 6,577,402 | B1 | 6/2003 | Miller |
| 6,597,820 | B1 | 7/2003 | Sheem |
| 6,701,775 | B1 | 3/2004 | Popielas et al. |
| 6,738,145 | B2 | 5/2004 | Sherrer et al. |
| 6,738,537 | B2 | 5/2004 | Sheem |
| 6,978,074 | B2 | 12/2005 | Shu et al. |
| 6,998,599 | B2 | 2/2006 | Lagakos et al. |
| 7,020,354 | B2 | 3/2006 | Lagakos et al. |
| 7,149,374 | B2 | 12/2006 | Lagakos et al. |
| 7,187,453 | B2 | 3/2007 | Belleville |
| 7,379,630 | B2 | 5/2008 | Lagakos et al. |
| 7,460,740 | B2 | 12/2008 | Lagakos et al. |
| 7,646,946 | B2 | 1/2010 | Lagakos et al. |
| 7,889,416 | B1 * | 2/2011 | Stowe ........................... 359/291 |
| 7,916,306 | B2 * | 3/2011 | Iannuzzi et al. ............. 356/501 |
| 8,277,119 | B2 * | 10/2012 | Cloutier et al. ............... 374/161 |
| 2003/0015768 | A1 | 1/2003 | Bosco et al. |
| 2005/0157305 | A1 | 7/2005 | Yu et al. |
| 2006/0005603 | A1 | 1/2006 | Chau et al. |
| 2006/0284774 | A1 * | 12/2006 | Salsman ........................ 343/703 |
| 2008/0283755 | A1 * | 11/2008 | Dazzi et al. ............. 250/339.07 |
| 2009/0196543 | A1 | 8/2009 | Lagakos et al. |
| 2009/0202195 | A1 | 8/2009 | Lagakos et al. |
| 2011/0019701 | A1 * | 1/2011 | Pedersen et al. ................. 372/14 |

OTHER PUBLICATIONS

Bucaro J.A., Lagakos, N.,"Lightweight Fiber Optics Microphones and Accelerometers," Review of Scientific Instruments, vol. 72, pp. 2816-2821 (Jun. 2001).

Krohn, D.A., Fiber Optic Sensors—Fundamentals and Applications, Instrument Society of America, Research Triangle Park, NC, Chapters 3 and 8, 1992.

Lagakos N., Cole J.H., and Bucaro J.A., "Microbend Fiber-optic Sensor," Applied Optics 26, p. 2171-2180 (Jun. 1987).

Lagakos, N., Trott, W., Hickman, T., Cole, J., Bucaro, J., "Microbend fiber-optic sensor as extended hydrophone", IEEE Journal of Quantum Electronics, vol. 18, Issue 10, pp. 1633-1638, Oct. 1982.

Miers, D.R. ,Raj, D., Berthold, J.W. , "Design and characterization of fiber optic accelerometer," Fiber Optic and Laser Sensors V, Proc. Soc., SPIE vol. 838, pp. 314-317 (1987).

He, G. and Cuomo, F.W., "Displacement Response, Detection Limit, and Dynamic Range of Fiber-Optic Lever Sensors", J. Lightwave Tech., vol. 9, No. 11, Nov. 1991, pp. 1618-1625.

Hu, A., Cuomo, F.W., Zuckerwar, J., "Theoretical and Experimental Study of a Fiber Optic Microphone", J. Acoustical Society of America, vol. 91, pp. 3049-3060, 1992.

Zuckerwar, A.J., Cuomo, T.D., Nguyen, T.D., Rizzi, S.A., Clevenson, S.A., "High Temperature Fiber-Optic Lever Microphones", J. Acoustical Society of America, vol. 97, Issue 6, pp. 3605-3616, Jun. 1995.

Aref S.H., Zibaii M.I., and Latifa H., "An improved fiber optic pressure and temperature sensor for downhold application", Meas. Sci. Technol., vol. 20, Feb. 2009, pp. 034009-1-034009-6.

Yueming, L. Xiaoqiang, Z, and Shaojun, Z, "Novel temperature sensor based on Fabry-Perot cavity structure and micro-mechanical bi-layered membranes", SPIE Proceedings, vol. 6032, DOI:10.1117/12/667855, 7 pages, Feb. 2006.

Huang, Z., Peng, W., Xu, J., Pickrell, G.R., and Wang, A., "Fiber temperature sensor for high-pressure environment", Optical Engineering, vol. 44, No. 10, 104401-1-104401-6 (Oct. 2005).

Shimada M., Kinefuchi Y., and Takahashi K., "Sleeve-Type Ultra Miniature Optical Fiber Pressure Sensor Fabricated by DRIE", IEEE Sensors Journal, vol. 8, No. 7, Jul. 2008, pp. 1337-1341.

Totsu, K., Raga, Y., Esashi, M., "Ultra-miniature fiber-optic pressure sensor using white light interferometry", J. Micromechanics and Micromachining, vol. 15, pp. 71-75, 2005.

Katamatsu, H., et al., "Micromachined 125 um diameter ultra miniature fiber-optic pressure sensor for catheter", T. IEE Japan, vol. 120-E, No. 2, pp. 58-63 (2000).

Melamud, R. et al., "Development of an SU-8 Fabry-Perot Blood Pressure Sensor" IEEE International Conference on Micro Electro Mechanical Systems, 2005, pp. 810-813.

* cited by examiner

IMAGE OF EDGE OF REFLECTING STRIP

FIG. 8B

MINIATURE FIBER OPTIC TEMPERATURE SENSOR WITH EDGE REFLECTOR

CROSS-REFERENCE TO RELATED APPLICATIONS

This Application is a nonprovisional of and claims the benefit of U.S. Provisional Application 61/235,157 filed on Aug. 19, 2009, the entire disclosure of which is incorporated herein.

BACKGROUND

1. Technical Field

This patent application is related to intensity modulated fiber optic sensors, and more specifically, to fiber optic sensors for measuring temperature.

2. Related Technology

In recent years, optical fibers have formed the basis for many different types of sensors, such as microphones, static and dynamic pressure sensors, strain sensors, among others. Optical fiber sensors can use interferometry or intensity modulation. Intensity modulated fiber optic sensors, while often less sensitive than comparable interferometric sensors, are simpler and less expensive.

An interferometric fiber optic temperature sensor is disclosed in Aref, S. H., Zibaii, M. I., and Latifi, H., "improved fiber optic pressure and temperature sensor for downhole application", Meas. Sci. Technol., Vol. 20, pp. 034009 (6 pages) (February 2009). Another interferometrically-based fiber optic temperature sensor system is described in Huang, Z., Peng, W., Xu, J., Pickrell, G. R., and Wang, A., "Fiber temperature sensor for high-pressure environment", Optical Engineering, Vol. 44, No. 10, 104401-1-104401-6 (October 2005).

The theory of intensity modulated optical fiber sensors, including pressure sensors and microphones, and examples of such sensors, are disclosed in U.S. Pat. No. 7,379,630 to Lagakos et al., U.S. Pat. No. 7,020,354 to Lagakos et al., and U.S. Pat. No. 7,460,740 to Lagakos et al. The entire disclosure of these documents is incorporated herein by reference. U.S. Pat. No. 7,149,374 to Lagakos et al. discloses fiber optic pressure sensors having an etched diaphragm, and methods for forming the diaphragm. U.S. patent application Ser. No. 12/113,749 to Lagakos et al. discloses intensity modulated fiber optic strain sensors. The entire disclosures of these documents are incorporated herein by reference.

A temperature sensor using optical interferometry with a bimetallic membrane and an optical fiber source is discussed in Yueming, L. Xiaoqiang, Z, and Shaojun, Z, "Novel temperature sensor based on Fabry-Perot cavity structure and micro-mechanical bi-layered membranes", SPIE Proceedings, Vol. 6032, DOI:10.1117/12/667855, 7 pages, February 2006.

Intensity modulated fiber optic acceleration and displacement sensors using edge reflector techniques are described in U.S. patent application Ser. No. 12/246,761 to Lagakos et al., the entire disclosure of which is incorporated herein in its entirety.

BRIEF SUMMARY

An aspect of the invention is directed to a fiber-optic temperature sensor having a cantilever beam including two different material strips with different thermal expansion coefficients, a reflective surface on an end of the cantilever beam, and an optical fiber probe including a first multimode optical fiber for emitting light from an end of the fiber and at least one second multimode optical fiber for receiving reflected light from the reflective surface. Temperature changes at the sensor are indicated by a change in reflected light coupled into the multimode optical fiber due to lateral displacement of the edge of the reflective surface caused by bending of the cantilever beam.

A fiber-optic temperature sensor can alternatively have an optical fiber probe with a centrally arranged transmitting multimode optical fiber for emitting light from an end of the fiber, a first receiving multimode optical fiber for receiving reflected light from the reflective surface, and a second receiving multimode optical fiber for receiving reflected light from the reflective surface, the transmitting multimode optical fiber arranged between the first and second receiving fibers. Temperature changes at the sensor are indicated by a change in reflected light coupled into the first receiving fiber due to lateral displacement of the edge of the reflective surface caused by bending of the cantilever beam.

In another aspect of the invention, the optical fiber probe has a centrally arranged transmitting multimode optical fiber for emitting light from an end of the fiber, a first receiving multimode optical fiber for receiving reflected light from the reflective surface, a second receiving multimode optical fiber for receiving reflected light from the reflective surface, the transmitting multimode optical fiber arranged between the first and second receiving fibers. A transparent material is arranged over the end of the optical fiber probe. A reflector is arranged over a portion of the transparent material and aligned with the second receiving fiber. A temperature change at the sensor is indicated by a change in the difference in the light reflected by the cantilever beam reflector and coupled into the first receiving fiber and the light reflected by the reflector on the transparent material coupled into the second receiving fiber.

DETAILED DESCRIPTION OF EMBODIMENTS OF THE INVENTION

Fiber optic temperature sensors described herein use a bimetal reflector as an edge reflector to intensity modulate light.

FIGS. 1A, 1B, 1C, and 1D illustrate an example fiber optic temperature sensor and system.

The sensor 10 includes an optical fiber probe 11 and a cantilever beam 18 having two materials with different coefficients of expansion. The cantilever beam 18 will be referred to herein as "bimetallic", although materials other than metals can form the cantilever beam.

The cantilever beam 18 has an edge reflector 15 on the end face of the bimetallic cantilever beam that faces toward the optical fiber probe 11. The cantilever beam 18 includes two strips of materials having different coefficients of expansion. The material strips 16 and 17 are preferably affixed together continuously along their entire lengths. The attachment between the material strips can also be intermittent, and should be sufficient to force the material strips 16 and 17 to move as one beam under temperature changes.

The cantilever beam 18 has a fixed end and a free end. The end face of the free end of the cantilever beam 18 is spaced apart a small distance from the end of the optical fiber probe 11. Air, or another material that is substantially transparent at the operating wavelength of the sensor, fills the space between the polished ends of the optical fibers 12 and 13 and the edge reflector 15.

The sensor 10 includes an optical fiber probe 11 with two multimode optical fibers 12 and 13, each having a core and cladding with a lower index of refraction than the core. The first, or "transmitting", optical fiber 12 emits light from the end of the fiber 12 toward the free end of the bimetallic cantilever beam 18. The second, or "receiving" optical fiber 13 is arranged parallel to the transmitting optical fiber 12 and receives light reflected by the reflector 15 at the free end of the bimetallic cantilever beam.

The two multimode optical fibers 12 and 13 can be arranged within a sleeve 14, which can be a stainless steel tube or other material or shape. The optical fibers 12 and 13 can be epoxied in place, after which the ends of the fibers are highly polished.

The free end of the cantilever beam 18 and the end of the fiber probe 11 can be arranged inside a housing 19. The housing 19 can be a tube into which the fiber probe is affixed. Suitable tubing materials include metals such as aluminum and stainless steel, glass, plastic, or another material sufficiently rigid and heat resistant to maintain the housing's structural integrity in operation. The interior of the housing 19 can be sealed from the external environment in order to exclude dust or other contaminants. The fixed end of the cantilever beam 18 can be attached to the far end of the housing away from the optical fiber probe. An adhesive, mechanical fasteners, or chemical fasteners can be used to affix the multimode fibers and the cantilever beam to the housing.

The free end of the bimetallic cantilever beam 18 faces the optical fiber probe 11, and is free to bend in response to temperature changes. The different strips of materials of the cantilever beam 18 expand or contract by different amounts as they are heated or cooled, bending the beam in one direction if heated and in the other direction if cooled. The cantilever beam 18 is affixed to the housing 19 so the free end of the beam can move freely in the in-plane lateral direction 21 along the axis between the centers of the optical fibers 12 and 13. Preferably, the cantilever beam is much wider in the other in-plane direction 25, to ensure bending along the desired direction 21.

The reflective surface 15 can be a metallic reflective film such as gold, aluminum, silver, copper, titanium, or alloys thereof, or another type of reflective material deposited on a portion of the end face of the bimetal beam. The reflective surface can also be the highly polished surface of a portion of the cantilever beam, if the beam has a high reflectivity when polished. Examples include highly polished aluminum or other metals.

The transmitting fiber 12 and receiving fiber 13 in the optical fiber probe preferably have end faces that are well polished in order to minimize reflections at the fiber end. The end face of the optical fiber probe is spaced apart from the edge reflector at a distance d. This gap distance d can be set to a length that will provide good sensitivity and dynamic range. The gap between the optical fiber end and the reflective surface can contain air, a vacuum, or another substance that is substantially transparent at the operational wavelengths.

Figure 1A:
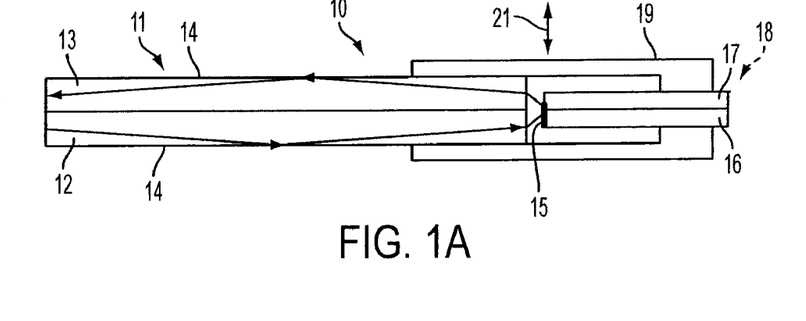
FIGS. 1A, 1B, 1C, and 1D illustrate an example of a fiber optic temperature sensor system in accordance with an embodiment of the invention.
Figure 1B:
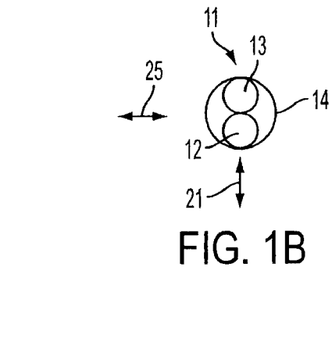
Figure 1C:
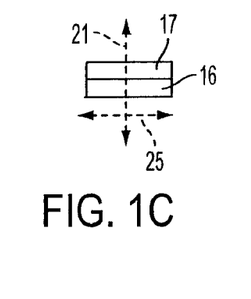
Figure 1D:
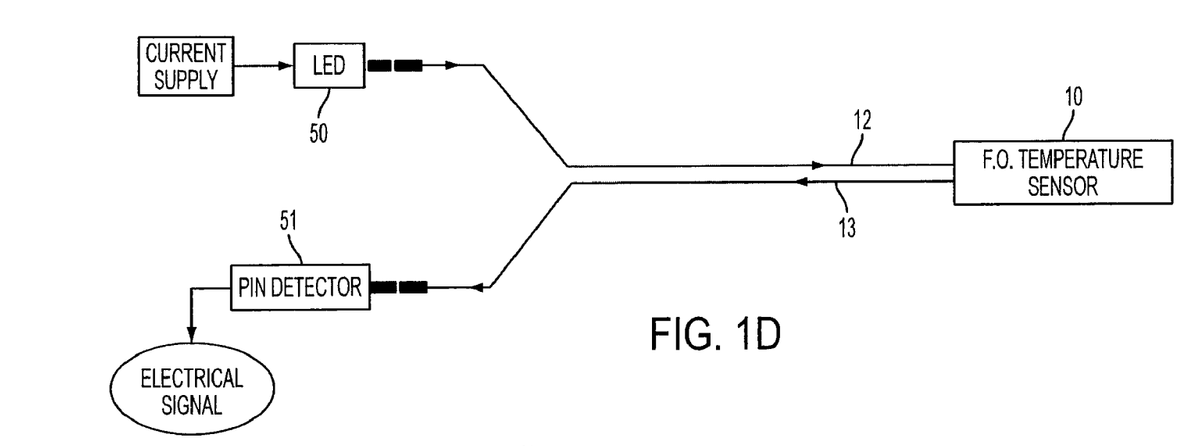

FIG. 1C illustrates fiber optic temperature sensor system that includes the sensor 10 in optical communication with a light source 50 and a photodetector 51. A photodetector is positioned at the opposite end of the receiving fiber 13 for receiving light from the sensor 10 via the receiving fiber. Other components and connectors can be arranged between the light source, the sensor 10, and the photodetector.

The light source can be a light emitting diode (LED) powered by a current source, with broadband light from the LED being coupled into the transmitting optical fiber of the sensor 12. The receiving fiber 13 transmits the reflected optical power to the photodetector 51. The photodetector produces an electrical voltage that corresponds to the intensity of the reflected light detected by the photodetector. Changes in amplitude of the voltage indicate movement of the edge reflector, and thus, changes in temperature at the sensor, as described in the following paragraphs.

The multimode optical fibers 12 and 13 of the optical probe can be 200 micron diameter glass core fibers with a 230 micron plastic clad (e.g., HCS, commercially available from Spectran Specialty Optics), a 500 micron Tefzel coating, and a 0.37 numerical aperture, although other multimode optical fibers are also suitable. Large core optical fibers will accept more of the reflected light into the core, and provide greater sensitivity. However, multimode fibers with relatively small cores can provide a smaller overall sensor size, so can be suitable for some applications.

A suitable light source is an Optek OPF370A LED emitting light at 850 nm wavelength. The detector can be a silicon PIN photodiode.

In operation, light from a LED is coupled into the sensor's multimode optical fiber, propagates through the core of the multimode fiber to end of the fiber, leaves the fiber, propagates through the gap between the fiber and the reflective surface, and is reflected back toward the fiber. As discussed in later paragraphs, a change in the amount of light received by the fiber indicates a change in the location of the edge of the reflector. As the temperature changes, the bimetal beam bends and the bimetallic cantilever end is displaced laterally. The movement of the edge reflector will cause a change in the amount of reflected light received in the optical fiber. Thus, the received light in the sensor's receiving multimode fiber is intensity modulated by the environmental temperature change. The photodetector generates an electrical signal whose amplitude corresponds to the optical intensity in the receiving multimode fiber.

The bimetallic cantilever beam 18 can be configured to encourage bending in the desired direction to provide good sensitivity. For example, the beam can be thinner in the desired bending direction 21 than in the perpendicular direction 25. The desired bending direction 21 is preferably parallel with an imaginary line between the centers of the cores of the transmitting and receiving fibers 12 and 13. The bending direction can be offset somewhat from this imaginary line, however, the resulting sensor may be less sensitive to temperature changes.

The cantilever beam can be formed of metals with different thermal expansion coefficients. For example, one of the material strips can be invar, which is a nickel steel alloy (64FeNi) having a very low coefficient of thermal expansion, and the other material strip can be a metal with a higher COE, such as stainless steel, aluminum, or copper.

Figure 2A:
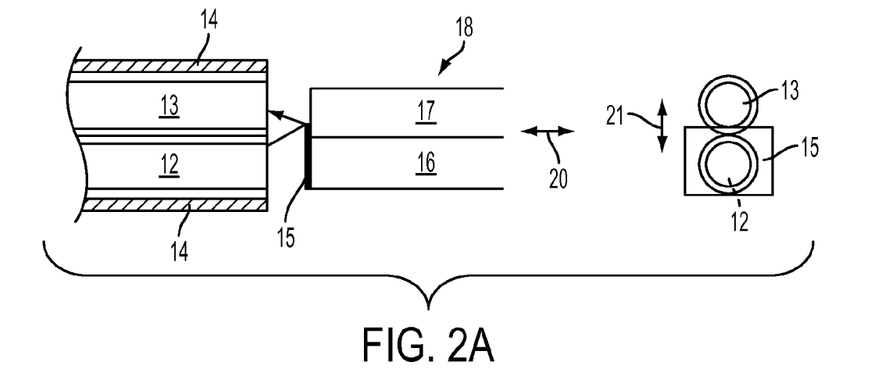
FIGS. 2A, 2B, and 2C illustrates the fiber optic sensor of FIG. 1 in operation.
Figure 2B:
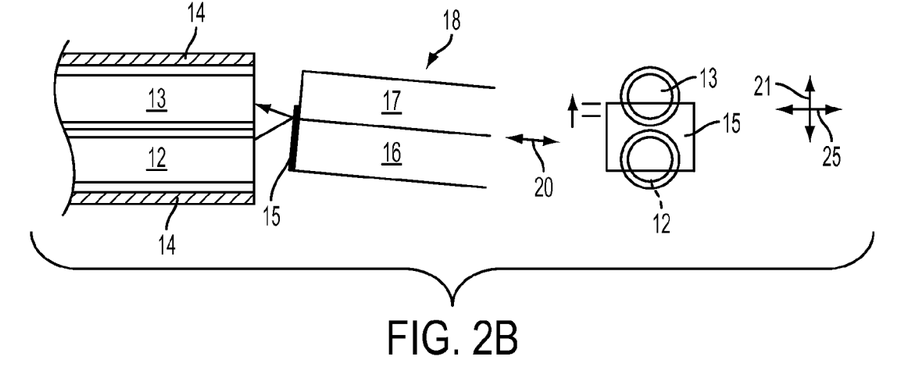
Figure 2C:
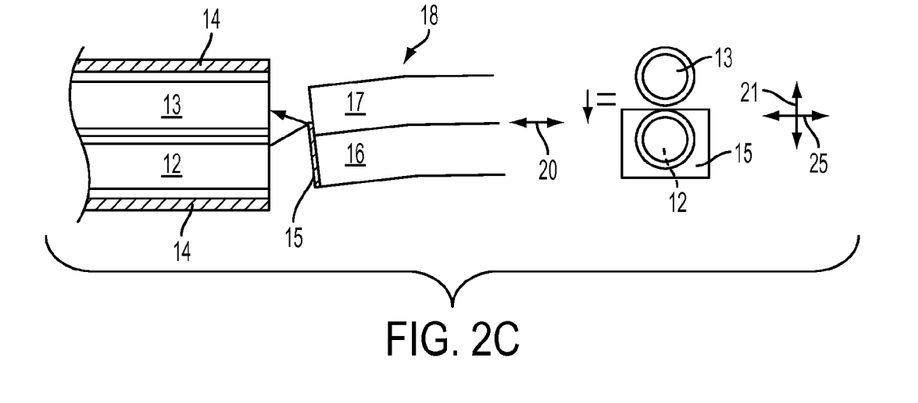

FIG. 2A-2C illustrate the temperature sensor of FIG. 1A-1D in operation. FIG. 2A shows the facing ends of the optical fiber probe 11 and the cantilever beam 18 when the sensor is at its normal or calibration temperature. The sensor can be built so the cantilever beam is straight at the center of its intended temperature range.

Figure 3:
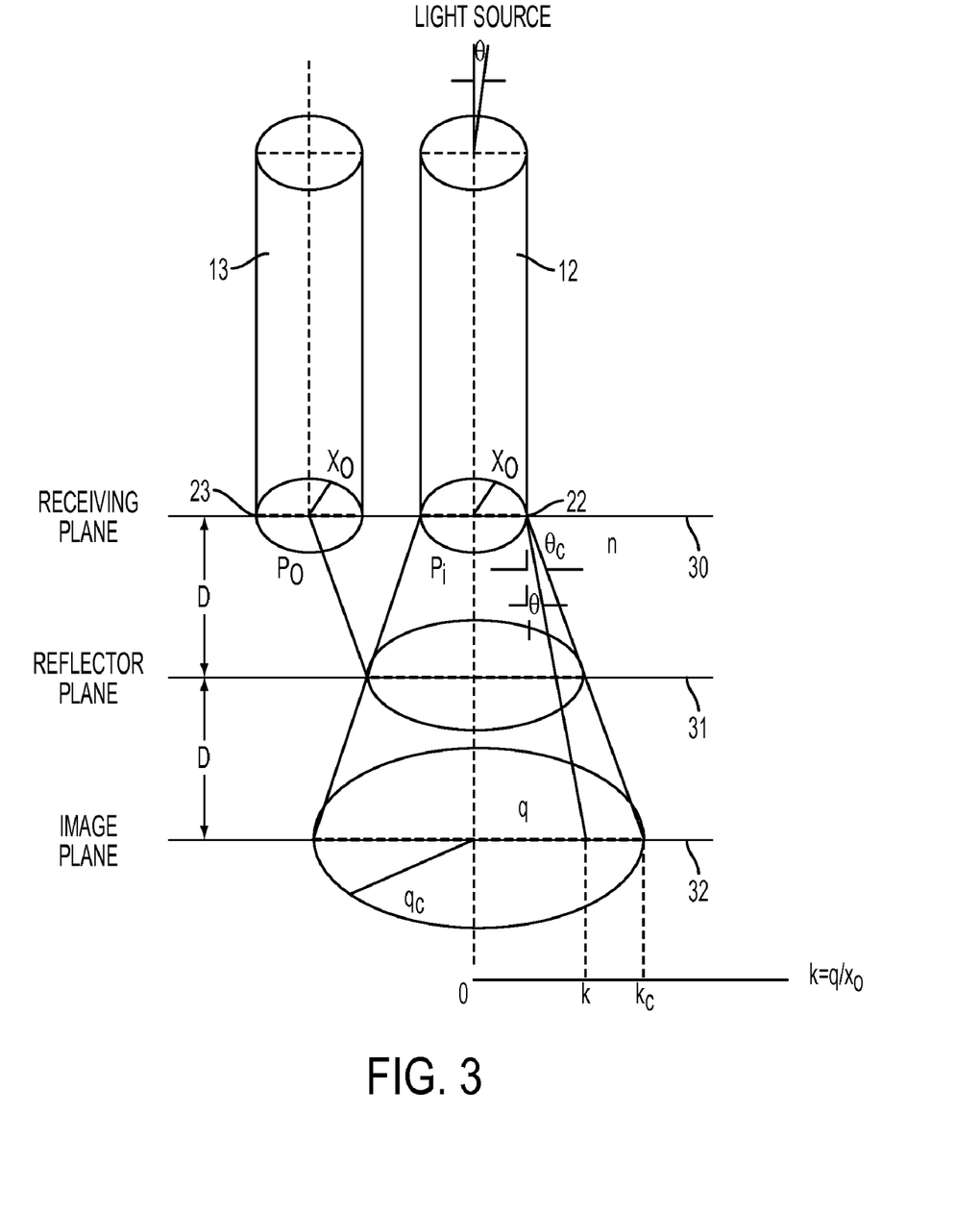
FIG. 3 illustrates a transmitting fiber, a receiving fiber, and an edge reflector at the reflector plane with respect to the image plane.

As shown in FIG. 2A and FIG. 3, light from the LED is transmitted through the transmitting fiber 12, is emitted from the polished fiber end 22, and reflected by the edge reflector 15. Part of the reflected light is coupled into the polished end 23 of the receiving fiber 13. The receiving fiber 13 guides the light to the photodetector.

The fraction of the light emitted from the polished fiber end 22 that is reflected back into the receiving fiber end 23 depends on the distance between the reflector 15 and the fiber ends 23 and 22 and on the transverse (or lateral) position of the reflector. If the distance is held constant, and the edge reflector is moved laterally, in the plane of the reflector ("in-plane"), a greater or smaller amount of light will be reflected back into the receiving fiber end 23. Thus, vibration or motion of the reflector 15 in the in-plane direction 21 will modulate the detected light power at the photodetector.

As the temperature changes, the end of the bimetallic body 18 is displaced laterally, which in turn moves the edge reflector in an in-plane direction 21 (in the plane of the edge reflector). As the edge reflector 15 intercepts and reflects more or less of the light emitted from the end of the transmitting fiber 12, the amount of light coupled into the receiving fiber 13 changes. By monitoring the output electrical signal from the photodetector, the position of the edge reflector 15 relative to the sensor fiber ends, and thus, the temperature at the fiber sensor, can be determined.

As shown in FIG. 2B, as the temperature at the sensor increases, the cantilever beam 18 bends in the direction of the material strip with the lower COE. In this example, the material strip 16 has a higher thermal expansion coefficient than the adjacent material strip 17 of the cantilever beam, and the cantilever beam 18 bends toward the lower COE material strip 17. As the cantilever beam 18 bends, the edge reflector 15 on the end face of the beam is displaced laterally. More of the light emitted from the transmitting fiber 12 is intercepted and reflected by the edge reflector 15 toward the receiving fiber 13.

FIG. 2C illustrates a decrease in temperature, with the higher COE material strip 16 contracting longitudinally more than the adjacent material strip 17, bending the cantilever beam 18 in the opposite lateral direction. Less of the light emitted from the transmitting fiber 12 is intercepted by the edge reflector 15 toward the receiving fiber 13.

The lateral or "in-plane" displacement of the end of the cantilever beam 18 is larger than the small lengthwise expansion in the cantilever beam.

The optical fiber probe can be positioned at a distance (in the longitudinal direction along the axis of the optical fiber probe) from the reflector for sensitivity and dynamic range. The probe and cantilever beam are carefully aligned so the edge of the reflector is in the correct longitudinal and lateral position with respect to the optical fiber probe. For example, the edge of the edge reflector can be approximately perpendicular to an imaginary line between the centers of the multimode fibers of the optical fiber probe. After alignment, the cantilever beam and the optical fiber probe can be glued or otherwise affixed to the housing.

The following discussion about theoretical aspects of the fiber optic temperature sensors is provided for information, without limiting the invention to any particular theory of operation.

Figure 4:
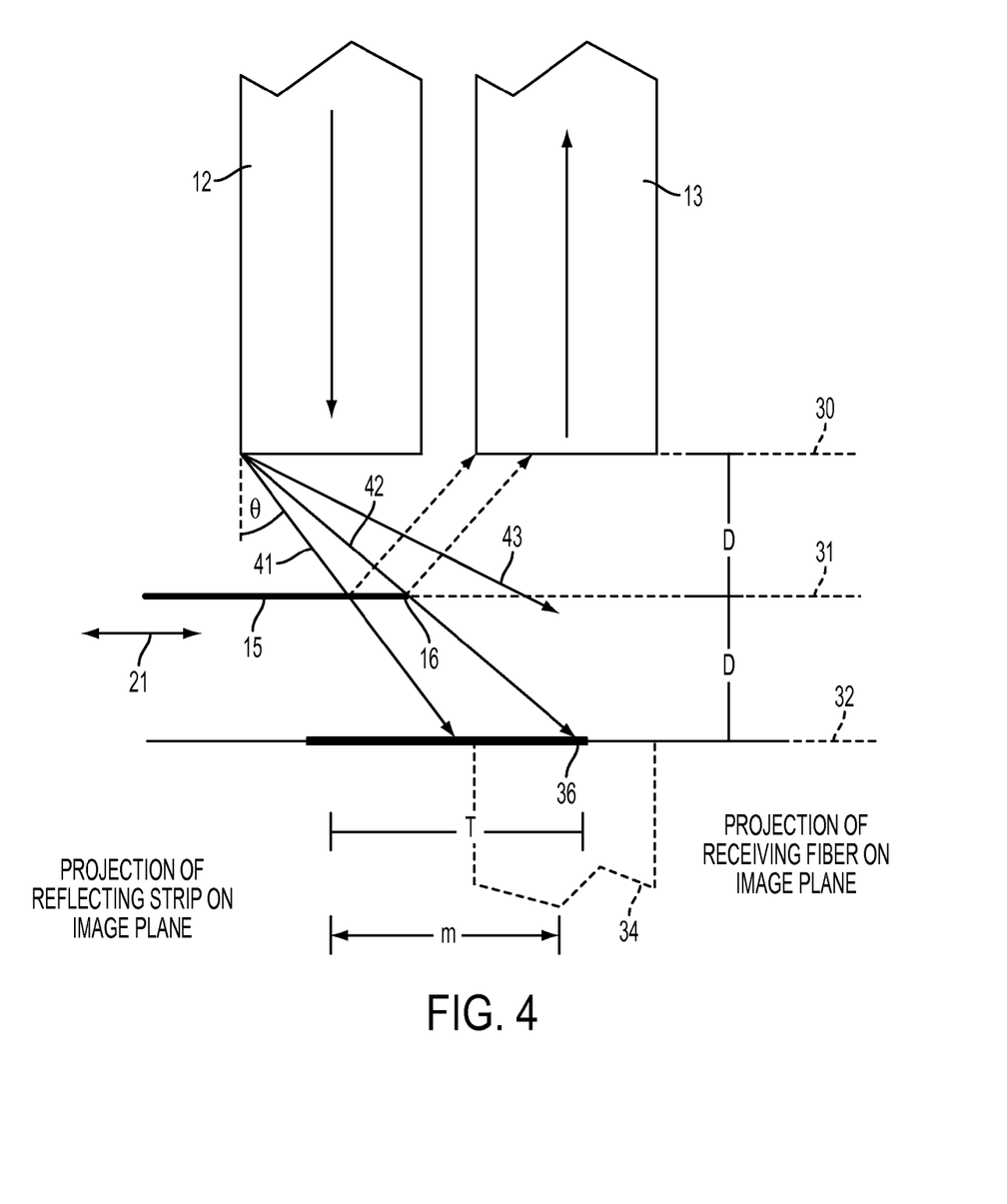
FIG. 4 is another view of the transmitting fiber, receiving fiber, and edge reflector at the reflector plane of FIG. 3.

FIG. 3 and FIG. 4 illustrate a transmitting fiber 12 and a receiving fiber 13, with a reflector 15 at the reflector plane spaced apart at a distance D from the fiber ends. The reflector 15 is sized and initially arranged so it intercepts all the light emitted from the sensor end of the transmitting fiber. The LED light source illuminating the transmitting fiber will contain beams arriving from all angles $\theta$ with respect to the fiber axis. The rays with an angle $\theta \leq \theta_c$ will couple into the fiber. The critical angle $\theta_c = \sin^{-1}(NA/n)$ is the cutoff angle determined by the fiber numerical aperture NA and the refractive index n of the surrounding medium. Similarly, the light rays exiting the fiber sensing end of the transmitting end will form a cone with a maximum angle $\theta_c$. The beam in the direction between $\theta$ and $\theta_c$ is defined as a uniangular beam for $0 \leq \theta \leq \theta_c$ and the reflected intensity on the receiving plane is equivalent to that on the image plane. Assume equal power illumination from uniangular beams, such that the incident light rays coming from different $\theta$ directions couple the same amount of optical power into the fiber core area based on an insignificant change of this power within a small acceptance angle.

In terms of the transmitting fiber core radius $X_0$, define $K=X_0$ as a dimensionless coordinate on the image plane. The boundary of the illuminated area is $K_c$, defined as $K_c=(Q_c/X_0)=1+(2D \tan(\theta_c)/X_0)$, where K and $\theta$ are related by $\theta=\tan^{-1}[(K-1)X_0/2d]$. Define $P_i$ as the total optical power exiting the transmitting fiber and $P_0'$ as the power reflected back into the receiving fiber.

The normalized received power in the receiving fiber $P_0'/P_i$ is $P_0'/P_i=(2/\pi)\int_{m-1}^{b} I_k' \sigma k dk$ In this equation, $\sigma=\cos^{-1}[(K^2+m^2-1)/2Km]$, $m=2+2C_m/X_0$, $C_m$ is the cladding thickness, $I_k'=I_k/I_0$ is the dimensionless intensity, $I_0$ is the total light intensity at the transmitting optical fiber probe end, and $b=K_c$ if $K_c \leq m+1$ or $b=m+1$ if $K_c>m+1$.

In terms of these parameters, with $A=X_0/(2D)$, $I_k$ is:

(a) for $1 \leq K_c < 2$ and $0 \leq K \leq 2-K_c$:

$I_k=(AI_0/((1-A^2)\theta_c))[\tan^{-1}(K_c-1)-A \tan^{-1}[A(K_c-1)]]$ (b) for $1 \leq K_c < 2$ and $2-K_c < K \leq 1$:

$I_k=(AI_0/(2\theta_c(1-A^2)))[\tan^{-1}(K_c-1)-A \tan^{-1}[A(K_c-1)]+\tan^{-1}(1-K)-A \tan^{-1}[A(1-K)]]$ (c) for $K_c \geq 2, 0 \leq K \leq 1$, and $K_c-K \leq 2$:

$I_k=(AI_0/(2\theta_c(1-A^2)))[(\pi/4)-A \tan^{-1}A+\tan^{-1}(1-K)-A \tan^{-1}[A(1-K)]]+(AI_0/8\theta_c))ln[(K_c-1)^2(1+A^2)/[1+A^2(K_c-1)^2]]$ (d) for $K_c \geq 2, 0 \leq K \leq 1$, and $K_c-K>2$:

$I_k=(AI_0/(2\theta_c(1-A^2)))[(\pi/4)-A \tan^{-1}A+\tan^{-1}(1-K)-A \tan^{-1}[A(1-K)]]+(AI_0/8\theta_c))ln[(K+1)^2(1+A^2)/[1+A^2(K+1)^2]]$ (e) for $1 \leq K_c \leq 2$ and $1 \leq K \leq K_c$:

$$I_k = (AI_0/(2\theta_c(1-A^2)))[\tan^{-1}(K_c-1) - \tan^{-1}(K-1) + A\tan^{-1}[A(K_c-1)]]$$

(f) when $K_c > 2, 1 \leq K \leq 2$, and $K_c - K \leq 2$:

$$I_k = (AI_0/(2\theta_c(1-A^2)))[(\pi/4) - A\tan^{-1}A - \tan^{-1}(K-1) + A\tan^{-1}[A(K-1)]] + (AI_0/8\theta_c))\ln[(K_c-1)^2(1+A^2)/[1+A^2(K_c-1)^2]]$$

(g) when $K_c > 2$, $1 \leq K \leq 2$, and $K_c - K > 2$:

$$I_k = (AI_0/(2\theta_c(1-A^2)))[(\pi/4) - A\tan^{-1}A + \tan^{-1}(K-1) + A\tan^{-1}[A(K-1)]] + (AI_0/8\theta_c))\ln[(K+1)^2(1+A^2)/[1+A^2(K_c-1)^2]]$$

(h) when $K_c > 2$, $K > 2$, and $K_c - K \leq 2$:

$$I_k = (AI_0/8\theta_c))\ln[[(K_c-1)^2(1+A^2(k-1)^2)]/[(K-1)^2(1+A^2(K_c-1)^2)]]$$

(i) when $K_c > 2$, $K > 2$, and $K_c - K > 2$:

$$(AI_0/8\theta_c))\ln[[(K+1)^2(1+A^2(K-1)^2)]/[(K-1)^2(1+A^2(K_c-1)^2)]]$$

Figure 5:
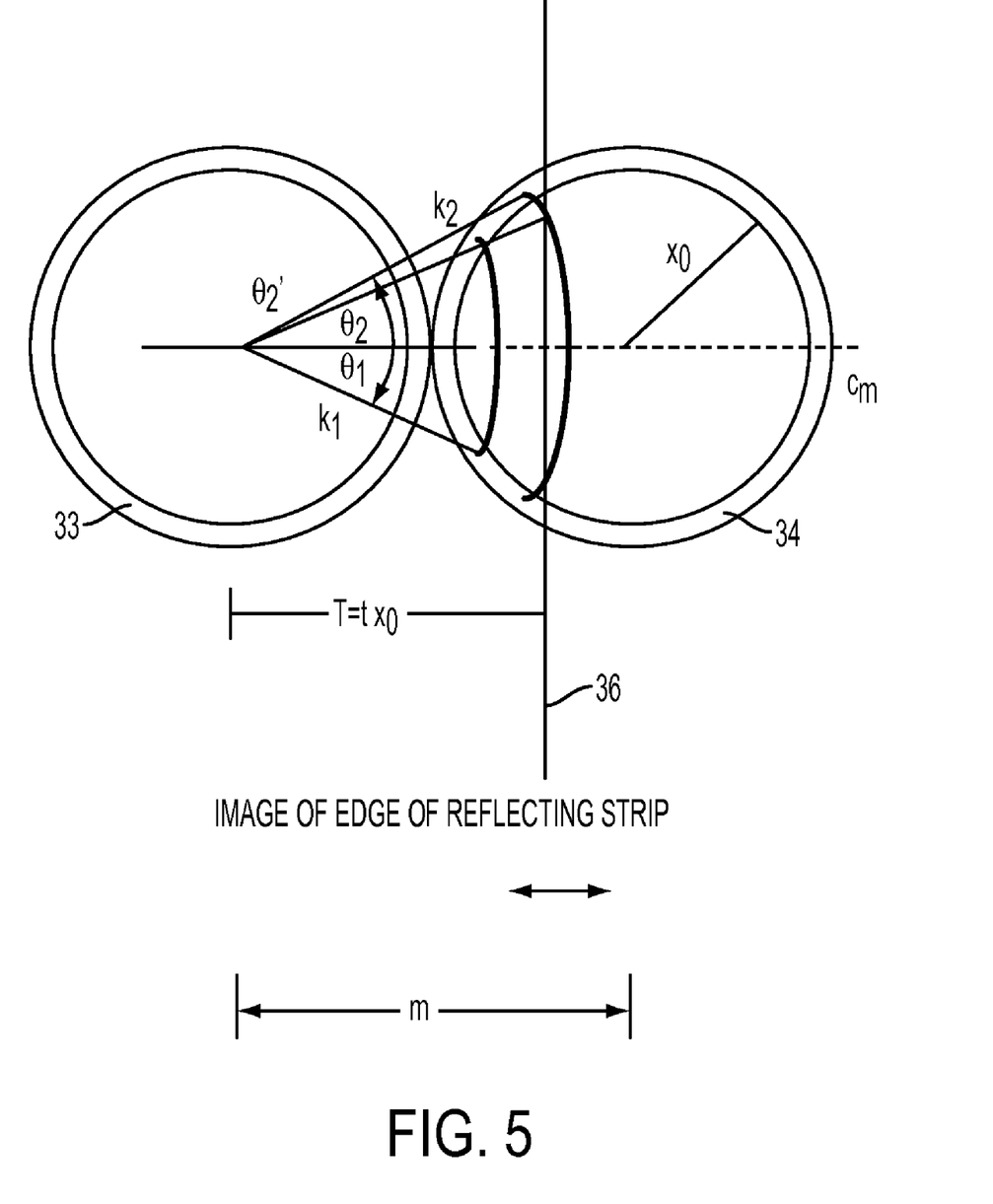
FIG. 5 is an end view of the fiber, receiving fiber, and edge reflector of FIGS. 3 and 4.

Only a portion of the light emitted from the transmitting fiber 12 is reflected by the reflector 15, as seen in FIG. 4. Note that rays 41 and 42 in FIG. 4 are reflected back toward the receiving fiber 13, but ray 43 does not intercept the edge reflector 15, so it is not reflected. The light that is not reflected by the reflector can be considered to be projected onto the image plane 32, located at a distance D from the plane of the reflector 15. A projection 36 of the edge of the reflector 15 on the image plane 32 is shown in a side view in FIG. 4 and in the top view in FIG. 5. A projection 33 of the transmitting fiber 12 and a projection 34 of the receiving fiber 13 are also shown in FIG. 4 and FIG. 5. Note that the projection 36 of the edge of the reflector 15 is a distance $T = tX_0$ from the center of the transmitting fiber projection 33, where $X_0$ is the radius of the receiving fiber.

The normalized reflected light power, $P_0/P_i$, can be stated as: $P_0/P_i = (2/\pi) \int_{m-1}^{t} (I_k/I_0) \sigma_1 k_1 dk_1 + (2/\pi) \int_{t}^{Z} (I_k/I_0) \sigma_2 k_2 dk_2$, where the upper bound of integration for the second term is $Z = (1 - m^2 + 2mt)^{1/2}$. $I_k/I_0$ is the normalized intensity, and $I_0$ is the intensity exiting the transmitting fiber $I_0 = P_i/(2k_i x_o^2)$. The sigma terms, $\sigma_1$ and $\sigma_2$, are equal to $\sigma_1 = \theta_1 = \cos^{-1}[(k_1^2 + m^2 - 1)/(2k_1 m)]$ and $\sigma_2 = \theta_2 - \theta$, respectively, where $\theta_{2=\cos}^{-1}[(k_2^2 + m^2 - 1)/(2k_2 m)]$ and $\theta = \cos^{-1}(k/k_2)$. So, $\theta_2$ can be written in terms of k, $k_1$, and $k_2$ as $\theta_2 = \cos^{-1}[(k_2^2 + m^2 - 1)/(2k_2 m)] - \cos^{-1}(k/k_2)$.

Figures 6A, 6B, 6C, 6D:
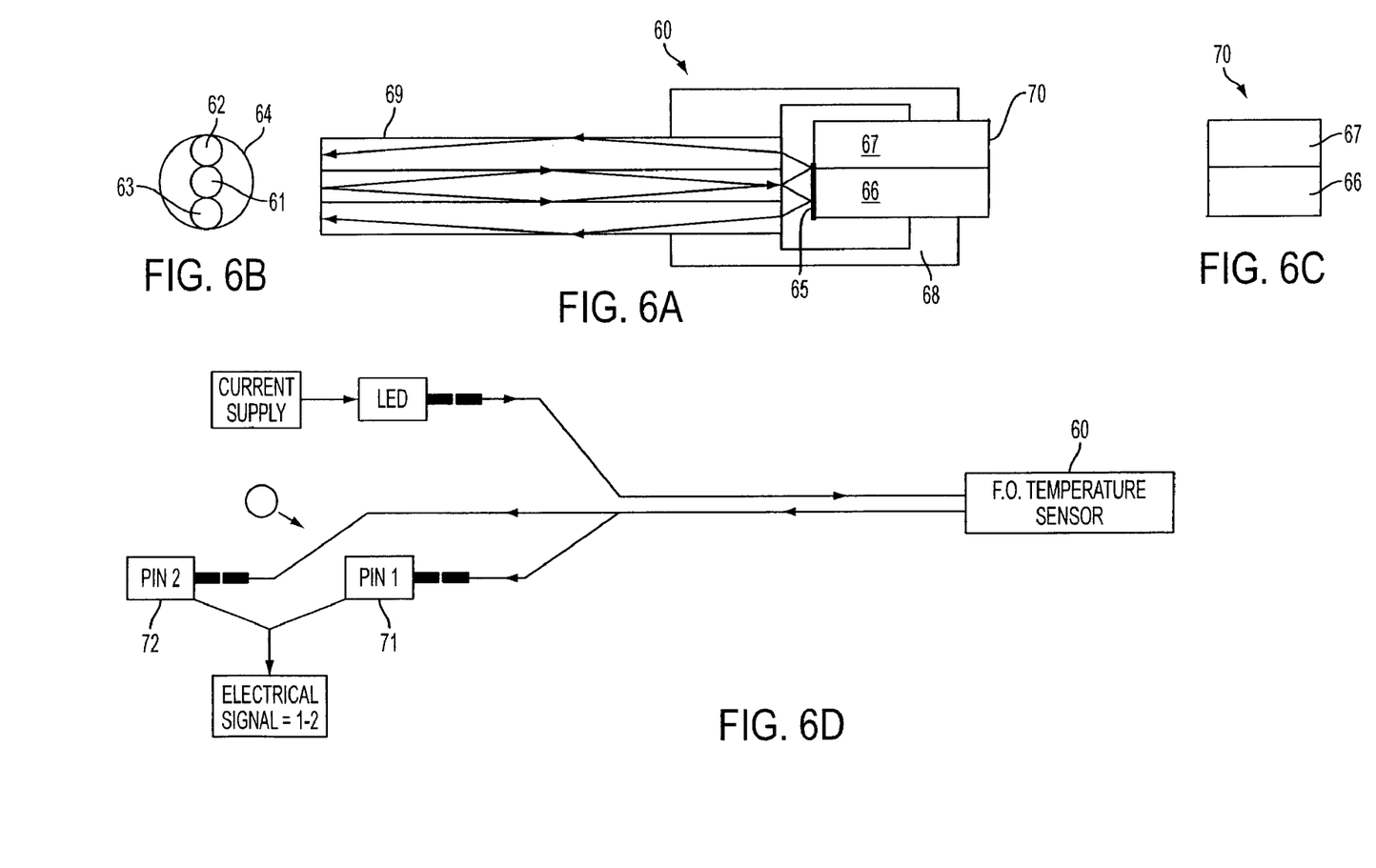
FIGS. 6A, 6B, 6C, and 6D illustrate a fiber optic temperature sensor having a bimetallic cantilevered edge reflector and a fiber probe with a transmitting fiber, a sensing receiving fiber, and a reference receiving fiber.

FIGS. 6A, 6B, and 6C illustrate an example of a fiber optic temperature sensor 60 having a bimetallic cantilevered edge reflector and a optical fiber probe 69 with a transmitting fiber 61, a sensing receiving fiber 62, and a reference receiving fiber 63.

In this example, the three-fiber optical fiber probe 69 includes two receiving fibers. The two receiving fibers 62 and 63 are arranged on opposite sides of a centrally located transmitting fiber 61. The reference receiving fiber accepts light from the middle of the reflector 65. The sensing receiving fiber receives light from the edge portion of the reflector 65. An in-plane displacement of the reflector 65 on the cantilever body will change the amount of light coupled into the sensing receiving fiber 62. The in-plane displacement of the reflector 65 on the cantilever will not change the amount of light power in the reference receiving fiber 63.

The reference receiving fiber 63 is intended to compensate for changes in the gap length between the end of the optical fiber probe 69 and the reflector 65 due to bending of the cantilever beam 70, expansion or contraction of the housing 68, or other factors.

Each receiving fiber 62, 63 transmits the reflected light to a separate photodetector 71, 72. By monitoring the output electrical signals from the photodetectors, the lateral position of the edge reflector 15 relative to the sensor fiber ends, and thus, the temperature at the fiber sensor 60, can be determined. For example, the output voltage of the photodetector 71 receiving light from the reference receiving fiber 63 can be subtracted from the output voltage of the photodetector 72 receiving light from the sensing receiving fiber 62.

The end of the optical fiber probe 69 can be positioned at a distance (in the longitudinal direction along the axis of the optical fiber probe) from the reflector 15 for sensitivity and/or dynamic range. The probe and cantilever beam are aligned carefully so the edge of the reflector is in the correct lateral position with respect to the transmitting and receiving fibers. For example, the edge of the edge reflector can be approximately perpendicular to an imaginary line between the centers of the multimode fibers of the optical fiber probe. After alignment, the cantilever beam and the optical fiber probe can be glued or otherwise affixed to the housing.

FIGS. 7A, 7B, 7C, and 7D illustrate an example of a fiber optic temperature sensor having a bimetallic cantilevered edge reflector and a optical fiber probe with a transmitting fiber, a sensing receiving fiber, and a reference receiving fiber.

Figures 7A, 7B, 7C, 7D:
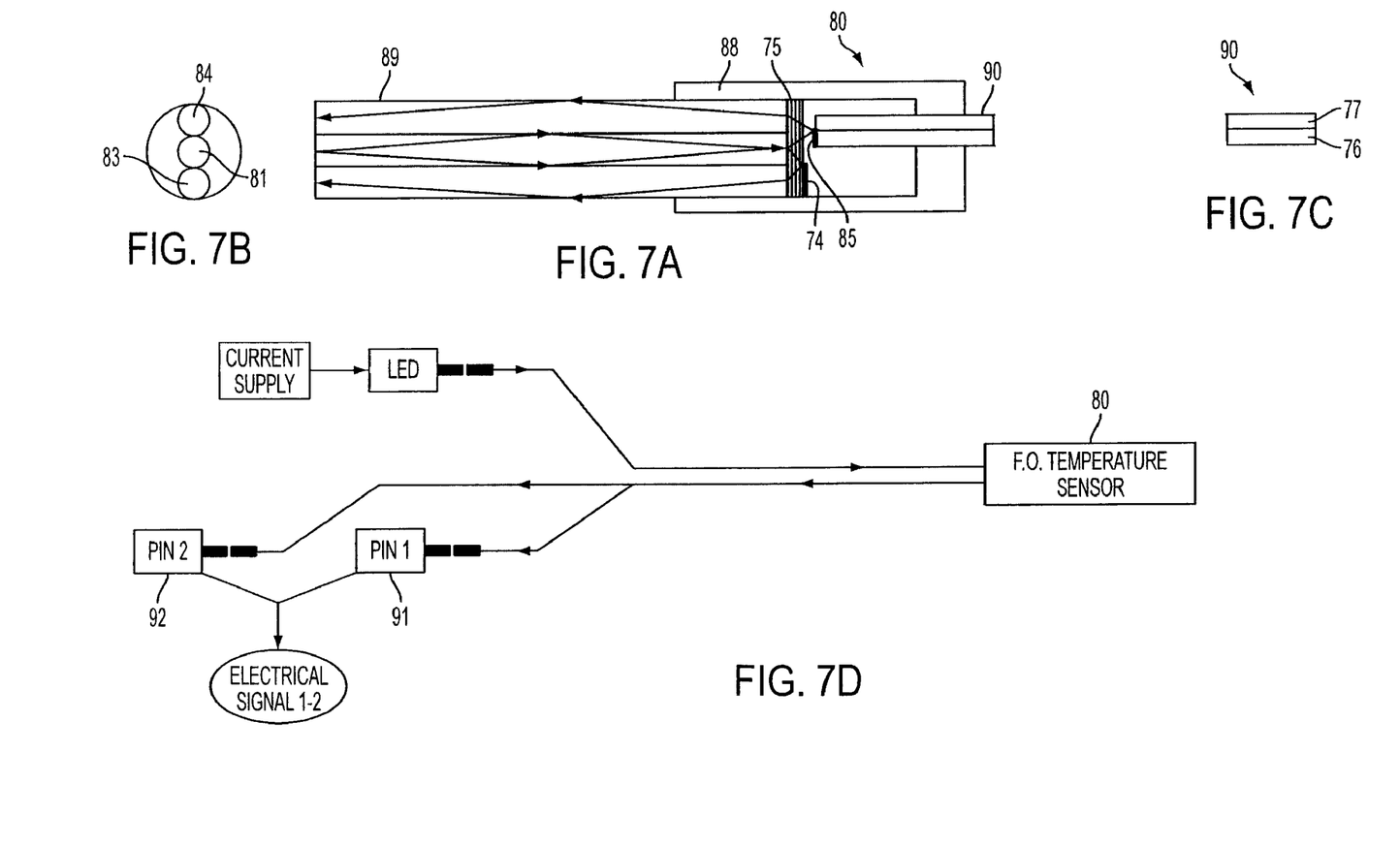
FIGS. 7A, 7B, 7C, and 7D illustrate a fiber optic temperature sensor having a bimetallic cantilevered edge reflector and a fiber probe with a transmitting fiber, a sensing receiving fiber, and a reference receiving fiber.

FIG. 7A illustrates a fiber optic temperature sensor 80 having a optical fiber probe 89 with a reference multimode optical fiber for reducing the noise effects of the LED system, the PIN detection system, and the sensor leads. The optical fiber probe 89 includes one centrally arranged multimode fiber 81 that transmits light from the LED source, a first multimode fiber 84 for receiving reflected light from the edge reflector on the cantilever beam, and a second, reference, multimode receiving fiber 83. The receiving fibers 83, 84 are arranged opposite each other on opposite sides of the transmitting fiber 81.

A solid, transparent, thin material 75 covers the end of the optical fiber probe 89 that faces toward the cantilever beam 90. A reflective film 74 or other reflective material partially covers the surface of the thin transparent material 75, as shown in FIG. 7A and FIG. 7C.

The optical fiber probe is aligned in such a way that light reflected by the transparent piece reflector 74 will be reflected into the reference receiving fiber 83, and that the light reflected by the edge reflector 85 will be reflected toward the sensing receiving fiber 84.

A constant portion of the light emitted from the end of the transmitting fiber 81 is reflected by the transparent piece reflector 74 and received by the reference receiving fiber 83. The reflected light entering the reference receiving fiber 83 will not have been transmitted through the air gap between the end of the optical fiber probe and the cantilever beam's reflector surface 85, so the amount of light received by the reference receiving fiber 83 will not be affected by any change in path length due to temperature or other environmental factors.

A portion of the light emitted from the end of the transmitting fiber 81 is not intercepted by the reflector surface 74 on the thin transparent cover material 75. This remaining portion of light is transmitted through the air gap toward the cantilever beam 90. As the temperature changes, the cantilever beam 90 is bent laterally, as discussed in the paragraphs addressing the FIG. 2A-2C cantilever beam.

Depending on the lateral displacement of the edge reflector 85 on the cantilever beam, a portion of the light reflected by the edge reflector 85 is received in the sensing receiving fiber 84. The amount of light received in the sensing receiving fiber 84 depends on the lateral displacement of the edge reflector 85, and therefore, on the temperature at the sensor.

Each of the receiving fibers 83 and 84 transmits the reflected light to a different photodetector 91 and 92, respectively. The voltage from the photodetector 91 is subtracted from the voltage from the signal photodetector 92, and the difference is indicative of the temperature.

Subtraction of the reference voltage from the signal voltage can reduce the noise effects due to the LED, the PIN detection system, sensor leads, and other common components.

The thin transparent piece 75 at the end of the optical fiber probe can have a substantially constant thickness, can be a disc shape with a diameter approximately equal to the optical fiber probe diameter, and can be a silica glass or other transparent material. In an embodiment of the invention, the thin transparent material 75 is a small part of a microscope slide.

The optical fiber probe can be positioned at a distance (in the longitudinal direction along the axis of the optical fiber probe) from the reflector for sensitivity and dynamic range. The probe and cantilever beam are carefully aligned so the edge of the reflector is in the correct longitudinal and lateral position with respect to the optical fiber probe. For example, the edge of the edge reflector can be approximately perpendicular to an imaginary line between the centers of the multimode fibers of the optical fiber probe. After alignment, the cantilever beam and the optical fiber probe can be glued or otherwise affixed to the housing 88.

Figures 8A, 8B:
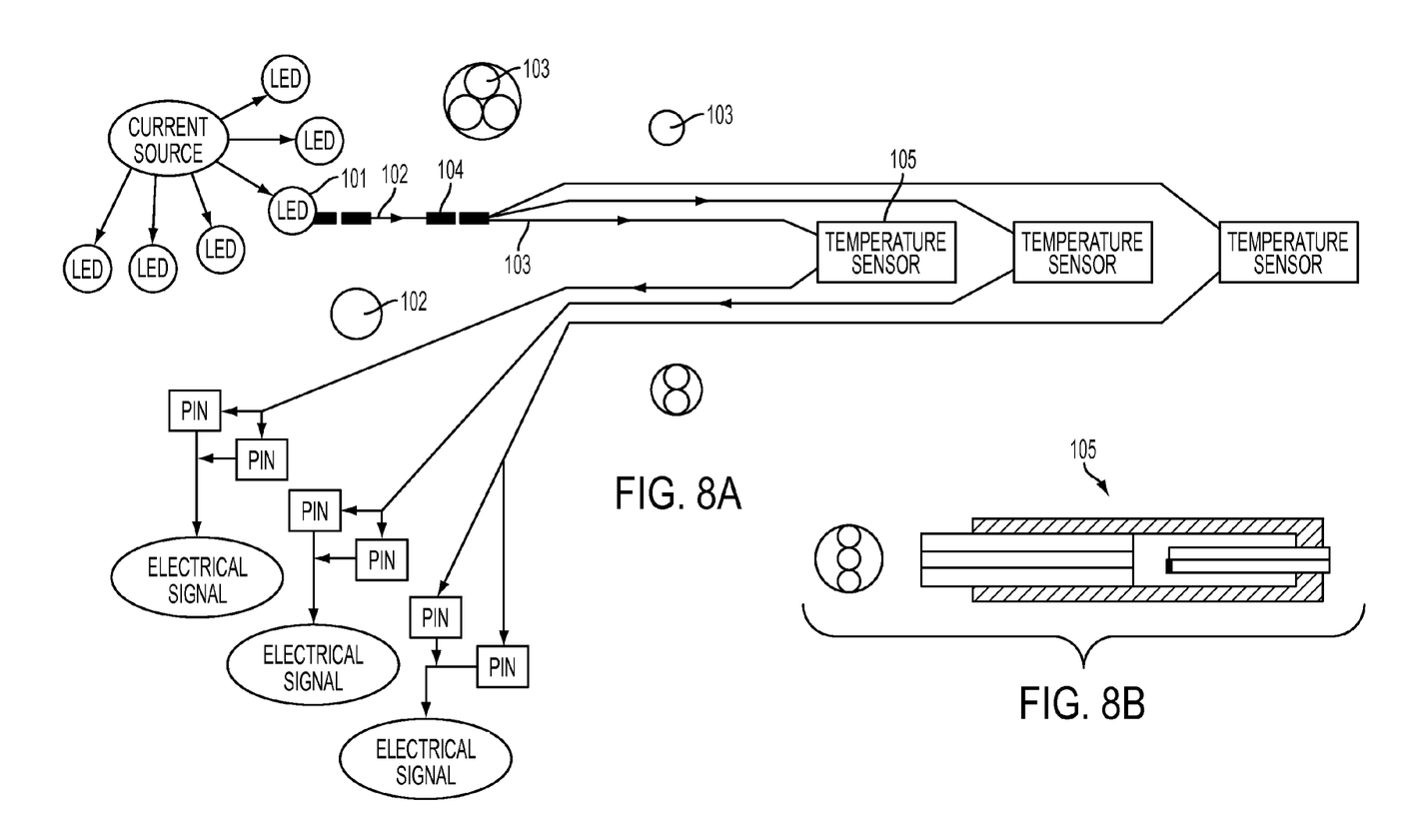
FIGS. 8A and 8B illustrate a multiplexed temperature sensor system in which each light emitting diodes supplies three temperature sensors.

FIG. 8 illustrates a multiplexed temperature sensor system according to an embodiment of the invention. To illustrate a multiplexing system, a temperature with a three-fiber optical fiber probe is shown, however, the other fiber probes and sensors described herein can also be multiplexed in this manner.

Each LED 101 is coupled to a length of large diameter optical fiber 102. Smaller diameter optical fibers 103 are arranged to receive light from the larger diameter optical fiber 102 at a connector 104. In this example, the larger diameter optical fiber is 400 microns in diameter, has a numerical aperture of 0.37, and is about six inches in length. The three 200 micron core diameter optical fibers 103 are arranged to receive equal amounts of light from the larger diameter optical fiber 102. Although various connectors can be used, it is preferred that the connectors maintain the smaller optical fiber with a large part of its core area abutting the core of the larger diameter fiber, in order to allow a large portion of the light to be transmitted into the smaller diameter fibers.

The short six inch larger diameter optical fiber 102 can couple the LED light more uniformly into the transmitting fibers 103 than arranging the three fibers to receive the light from the LED directly. Each of the optical fibers 103 extends to and supplies light to a different temperature sensor 105.

The sensors 105 can be one of the two-fiber or three-fiber temperature sensors described herein, another temperature sensor, or another type of optical fiber sensor.

The receiving optical fibers of the sensors 105 receive the reflected light, as discussed in previous paragraphs. The receiving fibers can transmit the light directly to the photodetectors 106, 107, or can be coupled to lengths of fiber via connector pairs for transmission to the photodetectors. The photodetectors convert the received light from the fiber optic sensors to electrical signals.

Figures 9A, 9B:
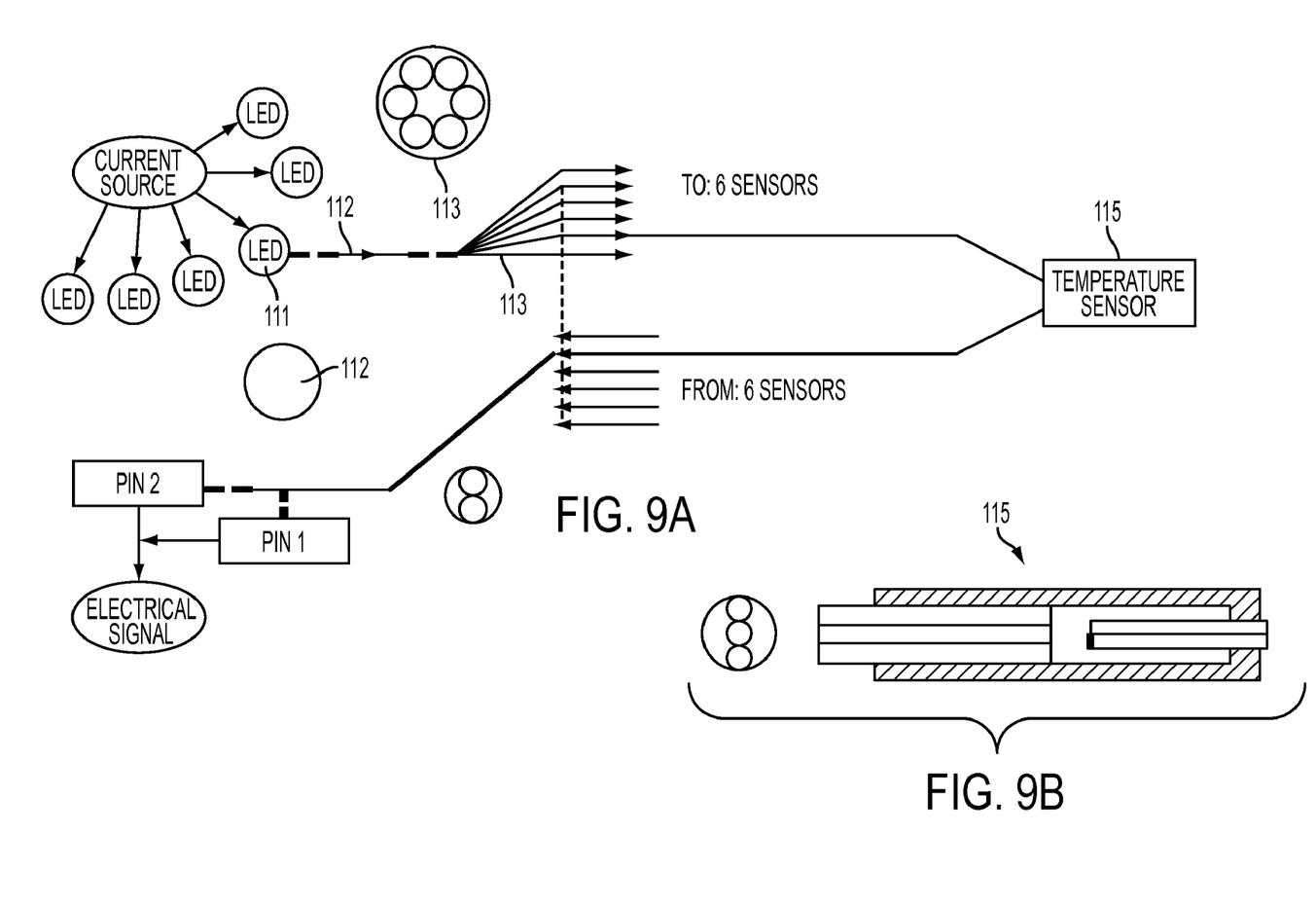
FIGS. 9A and 9B illustrate a multiplexed temperature sensor system in which each light emitting diodes supplies six temperature sensors.

More or fewer than three optical fibers can be used to receive light from the larger diameter optical fiber. For example, FIG. 9 illustrates a sensor system in which each LED 111 drives six fiber optic temperature sensors. The larger diameter optical fiber 112 with a core diameter of 600 microns and a numerical aperture of 0.37 efficiently supplies six 200 micron core diameter fibers 113 with light, allowing each current source to power thirty six sensors 115.

Suitable connectors are described in U.S. Pat. No. 7,460,740, the specification of which is incorporated by reference herein in its entirety.

The following list identifies suitable components are suitable for the sensors and sensor devices, although it will be recognized that many other components may also be used. One suitable current source is manufactured by Wavelength Electronics, model no. LDD200-1M. LEDs can be the OPF370A models at 100 mA supplied by Optek. Suitable 200 micron core diameter fiber is manufactured by OFS, headquartered in Norcross, Ga., USA, and is identified by model number CF01493-10. Suitable 400 micron core diameter fiber is manufactured by OFS, identified as model number CF01493-12. Suitable 600 micron core diameter fiber is manufactured by OFS, identified as model number CF01493-14. A suitable PIN detector is manufactured by Advanced Photonics, headquartered at Camarillo, Calif., USA, and identified by model number SD 100-41-21-231. Suitable fiber, PIN, and LED connectors are available from Fiber Instrument Sales (FIS), headquartered in Oriskany, N.Y., USA, and identified by model numbers #F1-0061830 and #5014741. Connectors can be modified if necessary to accommodate the larger diameter optical fibers and the multiple smaller diameter fibers to be connected.

Although this invention has been described in relation to the exemplary embodiments thereof, it is well understood by those skilled in the art that other variations and modifications can be affected on the preferred embodiment without departing from scope and spirit of the invention as set forth in the appended claims.

What is claimed as new and desired to be protected by Letters Patent of the United States is:

1. A fiber-optic temperature sensor, comprising:
    a cantilever beam including two different material strips with different thermal expansion coefficients, the cantilever beam having a reflective surface on an end of the cantilever beam;
    an optical fiber probe including a first multimode optical fiber for emitting light from an end of the fiber and at least one second multimode optical fiber for receiving reflected light from the reflective surface;
    wherein temperature changes at the sensor are indicated by a change in reflected light coupled into the second multimode optical fiber due to a change in lateral distance between the edge of the reflective surface and the longitudinal axis of the second multimode optical fiber caused by bending of the cantilever beam in the lateral direction.

2. The fiber optic temperature sensor according to claim 1, wherein the two different material strips comprise metal.

3. The fiber optic temperature sensor according to claim 1, wherein one of the material strips is invar and the other material strip is a metal with a higher thermal coefficient of expansion than invar.

4. The fiber optic temperature sensor according to claim 1, wherein the reflective surface has an edge that is perpendicular to a line between the centers of the first multimode optical fiber and the second multimode optical fiber.

5. The fiber-optic temperature sensor according to claim 1, in combination with a light source in optical communication with the transmitting multimode optical fiber and a photodetector in optical communication with the receiving multimode optical fiber.

6. A fiber-optic temperature sensor, comprising:
a cantilever beam including two different material strips with different thermal expansion coefficients, the cantilever beam having a reflective surface on an end of the cantilever beam;
an optical fiber probe including a centrally arranged transmitting multimode optical fiber for emitting light from an end of the fiber, a first receiving multimode optical fiber for receiving reflected light from the reflective surface, and a second receiving multimode optical fiber for receiving reflected light from the reflective surface, the transmitting multimode optical fiber arranged between the first and second receiving fibers;
wherein temperature changes at the sensor are indicated by a change in reflected light coupled into the first receiving fiber due to lateral displacement of the edge of the reflective surface caused by bending of the cantilever beam.

7. The fiber optic temperature sensor according to claim 6, wherein the two different material strips comprise metal.

8. The fiber optic temperature sensor according to claim 6, wherein one of the material strips is invar and the other material strip is a metal with a higher thermal coefficient of expansion than invar.

9. The temperature sensor of claim 6, the reflective surface having an edge, the edge being perpendicular to an imaginary line between the centers of the transmitting and the first and second receiving fibers.

10. The temperature sensor of claim 6, wherein an increase of temperature causes an edge of the reflector on the cantilever beam to bend toward the first material strip and to cause an increase in reflected light coupled into the first receiving fiber.

11. The temperature sensor of claim 6, in combination with a light source in optical communication with the transmitting multimode optical fiber, a first photodetector in optical communication with the first receiving multimode optical fiber, a second photodetector in optical communication with the second multimode optical fiber.

12. A fiber-optic temperature sensor, comprising:
a cantilever beam including two different material strips with different thermal expansion coefficients, the cantilever beam having a reflective surface on an end of the cantilever beam;
an optical fiber probe including
a centrally arranged transmitting multimode optical fiber for emitting light from an end of the fiber,
a first receiving multimode optical fiber for receiving reflected light from the reflective surface,
a second receiving multimode optical fiber for receiving reflected light from the reflective surface, the transmitting multimode optical fiber arranged between the first and second receiving fibers,
a transparent material arranged over the end of the optical fiber probe,
a reflector arranged over a portion of the transparent material and aligned with the second receiving fiber;
wherein a temperature change at the sensor is indicated by a change in the difference in the light reflected by the cantilever beam reflector and coupled into the first receiving fiber and the light reflected by the reflector on the transparent material coupled into the second receiving fiber.

13. The sensor according to claim 12, in combination with
a broadband light source in optical communication with the transmitting multimode optical fiber and
a first photodetector in optical communication with the first receiving fiber and a second photodetector in optical communication with the second receiving fiber.

14. The sensor according to claim 12, wherein the reflector on the transparent material and the reflective surface on the cantilever beam are metallic films.

15. The sensor according to claim 12, wherein the transparent material is a glass disc.

16. The fiber optic temperature sensor according to claim 12, wherein the two different material strips comprise metal.

17. The fiber optic temperature sensor according to claim 12, wherein one of the material strips is invar and the other material strip is a metal with a higher thermal coefficient of expansion than invar.

\* \* \* \* \*